Patented Oct. 8, 1935

2,016,784

UNITED STATES PATENT OFFICE 2,016,784

PRODUCTION OF ORGANIC SULPHO-HALIDES

Georg Kraenzlein, Hochst-on-the-Main, and Heinrich Hopff, Ludwigshafen-on-the-Rhine, Germany, assignors to I. G. Farbenindustrie Aktiengesellschaft, Frankfort - on - the - Main, Germany No Drawing. Application July 18, 1932, Serial No. 623,290. In Germany July 28, 1931

10 Claims. (Cl. 260—158)

The present invention relates to the production of organic sulpho-halides.

We have found that organic sulpho-halides are obtained in a simple manner by heating organic sulphonic acid salts with benzotrihalides, as for example benzotri-chloride, -bromide or -iodide or their substitution products, as for example 2,4-dichlorbenzotrichloride, 2-chlorbenzotrichloride, 4-chlorbenzotrichloride or 2-brombenzotrichloride.

When employing benzotrichloride the reaction proceeds, depending on the proportions of the components employed, as follows:—

1. $C_6H_5CCl_3 + RSO_3Na =$
$C_6H_5COCl + RSO_2Cl + NaCl$, or
2. $C_6H_5CCl_3 + 2RSO_3Na =$
$C_6H_5COONa + 2RSO_2Cl + NaCl$, in which R is an aliphatic open chain, cycloaliphatic, aromatic or heterocyclic radicle. In order to carry out the process it suffices to heat the components in the said molecular proportions for a short time to temperatures between about 120° and about 300° C., preferably between about 150° and about 200° C. The process is not limited to the said molecular proportions, however, any excess of one reaction component serving as a diluent. As the reaction proceeds, the reaction mixture becomes liquefied. For carrying out the process, salts of aliphatic, cycloaliphatic, aromatic or heterocyclic sulphonic acids, such as methane or ethane sulphonic sodium salts and benzene or toluene sulphonic sodium salts, and also their substitution products, as for example 4-chlortoluene-2-sulphonic acid or 4- or 5-chlornaphthalene sulphonic acid sodium salts and pyridine α- or β-sulphonic acid sodium salts may be employed. Instead of the said sodium salts other salts of the sulphonic acids may be employed. The said sodium salts or potassium, lithium and alkaline earth metal salts, such as those of calcium, strontium and barium, are, however, preferred.

In many cases it is preferable to work in the presence of inert solvents, as for example xylene, solvent naphtha, mono- or tri-chlorbenzene, nitrobenzene, 1,2-dichlorbenzene, paraffin oil, diphenyl or naphthalene.

The working up of the reaction mixture is carried out in the manner usual for the separation of acid chlorides from inorganic salts. For example the reaction mixture may be introduced into benzene, the separated sodium chloride removed, the benzene distilled off and the resulting solution separated into its components by fractional distillation. The reaction mixture may also be directly separated by fractional distillation.

The following examples will further illustrate how this invention may be carried out in practice but the invention is not restricted to these examples. The parts are by weight.

Example 1

A mixture of 200 parts of benzotrichloride and 230 parts of beta-naphthalene sulphonic acid sodium salt is heated in an oil bath for 3 hours at 200° C. After a short time the mass liquefies. The hot reaction product is poured into 500 parts of benzene, the deposited sodium chloride is filtered off by suction, the benzene expelled and the solution distilled in vacuo. About 90 per cent of pure benzoyl chloride and more than 80 per cent of pure beta-naphthalene sulpho-chloride having a melting point of 66° C. (both calculated on the theoretical yield) are obtained.

Instead of 200 parts of benzotrichloride, 268 parts of 2,4-dichlorbenzotrichloride mixed with 100 parts of nitrobenzene may be employed, whereby equally good yields of 2.4-dichlorbenzoyl chloride are obtained.

Example 2

200 parts of benzotrichloride and 194 parts of para-toluene sulphonic acid sodium salt are heated at 200° C. for 3 hours while stirring and then worked up in the manner described in Example 1. About 130 parts of benzoyl chloride and more than 160 parts of pure para-toluene sulpho-chloride having a melting point of 69° C. are obtained.

Example 3

118 parts of sodium methane sulphonate are heated for 3 hours at from 180° to 200° C. with 200 parts of benzotrichloride. By fractional distillation of the reaction mixture, about 70 per cent of the theoretical yield of pure methane sulphonic acid chloride having a boiling point of from 161° to 166° C. and about 90 per cent of the theoretical yield of pure benzoyl chloride are obtained. If, instead of the sodium methane sulphonate, 186 parts of cyclohexane sulphonic sodium salt be employed, 150 parts of cyclohexane sulpho-chloride, having a boiling point of 125° C. at about 13 millimeters of mercury, are obtained.

Example 4

50 parts of sodium anthraquinone-2-sulphonate are boiled under a reflux condenser for 3 hours with 100 parts of benzotrichloride, the reaction mixture then being filtered by suction while hot. When the resulting solution is allowed to cool, anthraquinone-2-sulpho-chloride crystallizes out in good yields. If, instead of the sodium anthraquinone-2-sulphonate, 91 parts of pyridine-α-sulphonic sodium salt be employed, about 70 parts of pyridine-α-sulpho-chloride are obtained.

*Example 5*

224 parts of sodium meta-nitrobenzene sulphonate are boiled for 4 hours under a reflux condenser with 200 parts of benzotrichloride and then worked up in the manner described in Example 1. The resulting mixture of benzoyl chloride and meta-nitrobenzene sulpho-chloride is separated into its components by fractional distillation, whereby 150 parts of m-nitrobenzene-sulpho-chloride and 110 parts of benzoyl chloride are obtained.

What we claim is:

1. The process for the production of organic sulpho-halides which comprises heating an organic sulphonic acid salt, corresponding to the formula $RSO_3X$ in which R denotes a hydrocarbon or halogenated hydrocarbon radicle or an unsubstituted heterocyclic radicle, and X denotes an alkali forming metal, with a benzotrihalide to a temperature between about 120° and about 300° C.

2. The process for the production of organic sulpho-halides which comprises heating an organic sulphonic acid alkali metal salt, corresponding to the formula $RSO_3X$ in which R denotes a hydrocarbon or halogenated hydrocarbon radicle or an unsubstituted heterocyclic radicle, and X denotes an alkali metal, with a benzotrihalide to a temperature between about 120° and about 300° C.

3. The process for the production of organic sulpho-halides which comprises heating an organic sulphonic acid alkali metal salt, corresponding to the formula $RSO_3X$ in which R denotes a hydrocarbon or halogenated hydrocarbon radicle or an unsubstituted heterocyclic radicle, and X denotes an alkali metal, with a benzothrichloride to a temperature between about 120° and about 300° C.

4. The process for the production of organic sulpho-halides which comprises heating an organic sulphonic acid alkali metal salt, corresponding to the formula $RSO_3X$ in which R denotes a hydrocarbon or halogenated hydrocarbon radicle or an unsubstituted heterocyclic radicle, and X denotes an alkali metal, with a benzotrichloride in the presence of an inert solvent to a temperature between about 120° and about 300° C.

5. The process for the production of organic sulpho-halides which comprises heating an organic sulphonic acid alkali metal salt, corresponding to the formula $RSO_3X$ in which R denotes a hydrocarbon or halogenated hydrocarbon radicle or an unsubstituted heterocyclic radicle, and X denotes an alkali metal, with an about equimolecular proportion of a benzotrichloride to a temperature between about 120° and about 300° C.

6. The process for the production of organic sulpho-halides which comprises heating an organic sulphonic acid alkali metal salt, corresponding to the formula $RSO_3X$ in which R denotes a hydrocarbon or halogenated hydrocarbon radicle or an unsubstituted heterocyclic radicle, and X denotes an alkali metal, with an about equimolecular proportion of a benzotrichloride to a temperature between about 150° and about 250° C.

7. The process for the production of organic sulpho-halides which comprises heating an organic sulphonic acid salt, corresponding to the formula $RSO_3X$ in which R denotes a hydrocarbon or halogenated hydrocarbon radicle or an unsubstituted heterocyclic radicle, and X denotes an alkali forming metal, with benzotrichloride to a temperature between about 150° and about 250° C.

8. The process for the production of organic sulpho-halides which comprises heating an aromatic sulphonic acid salt, corresponding to the formula $RSO_3X$ in which R denotes an aromatic hydrocarbon radicle or a halogenated aromatic hydrocarbon radicle and X denotes an alkali forming metal, with a benzotrichloride to a temperature between about 120° and about 300° C.

9. The process for the production of organic sulpho-halides which comprises heating an aliphatic sulphonic acid salt, corresponding to the formula $RSO_3X$ in which R denotes an aliphatic hydrocarbon radicle and X denotes an alkali forming metal, with a benzotrichloride to a temperature between about 120° and about 300° C.

10. The process for the production of naphthalene sulphochloride which comprises heating beta-naphthalene sulphonic acid sodium salt with benzotrichloride to a temperature between about 150° and about 250° C.

GEORG KRAENZLEIN.
HEINRICH HOPFF.